Dec. 9, 1930.  W. J. MILLER  1,784,373
POTTERY MOLD AND METHOD OF MAKING THE SAME
Filed Jan. 19, 1927
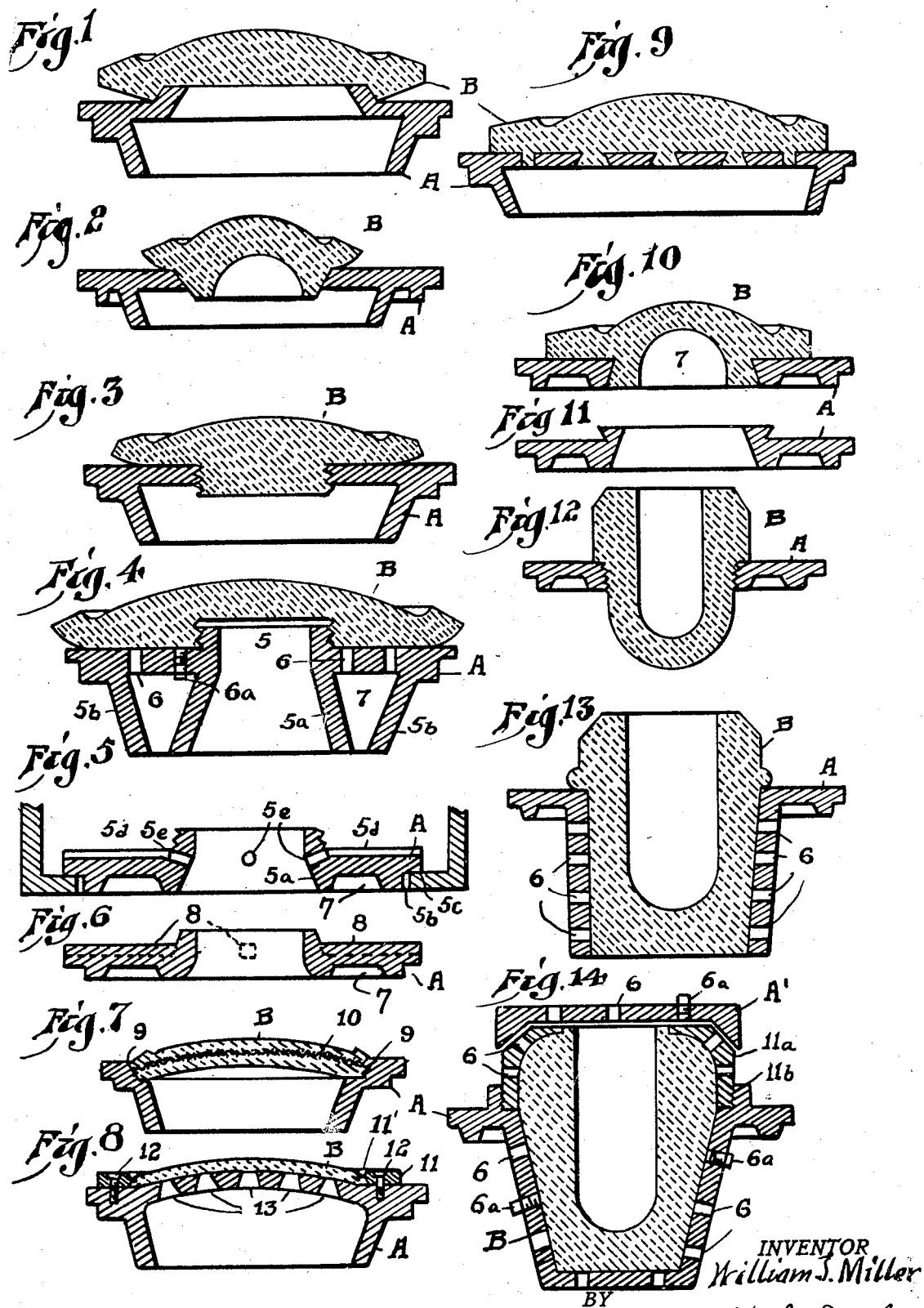

Patented Dec. 9, 1930

1,784,373

UNITED STATES PATENT OFFICE

WILLIAM J. MILLER, OF SWISSVALE, PENNSYLVANIA

POTTERY MOLD AND METHOD OF MAKING THE SAME

Application filed January 19, 1927. Serial No. 162,140.

This invention relates to mold construction for use in the manufacture of pottery, and the primary object of the same is to generally improve and render more durable molds of this class.

A further object of the invention is to reinforce the mold at such points where it is subjected to the greatest stress and strain and at the same time reduce the thickness or amount of material, which is usually plaster-of-Paris, used in the production of the mold, and thereby also reduce the cost of production.

Another object of the invention is to provide a standard base for molds which may also be utilized for various advantageous purposes, including the reinforcement of the mold and regulation of moisture-absorption and the drying action relatively to the plastic charge.

Another object of the invention is to prevent chipping of the mold through handling and cutting by the trimmer during the jiggering operation, and thereby prolong the life of the mold.

A further object of the invention is to provide a mold having a base which may be constructed independently of the body portion of the mold and shaped accurately to more positively engage and rotate with the chuck during the jiggering operation.

Other objects and advantages of the invention will be apparent in view of the following description and claims taken in connection with the drawings, which illustrate in transverse vertical section a number of molds constructed according to the features of my invention.

While I prefer to construct the base of the mold of metal of any desired thickness and weight, it is obvious that other material could be utilized for this purpose without departing from the scope of my invention. The metal base may be standardized and the plaster portion of the mold removably applied thereto so that the said plaster or body portion may be removed after it has become unfit for further use and replaced without the necessity of constructing an entirely new mold, or the plaster may in some instances be molded onto the base and broken away from the latter when it is desired to renew the upper or body portion of the mold. The base may also serve as a reinforcing means as well as a means for regulating the drying of the charge. By using a metal base, the amount of plaster-of-Paris usually employed in constructing molds of this type may be materially reduced without sacrificing the necessary strength or rigidity of the mold. By constructing the mold with a standard base, no change in chucks will be required when changing jobs, or the plaster portion or body of the mold may be adapted to any form or shape of article of pottery and attached to a standard base to fit one form of chuck. By this means, also, various sizes or shapes of molds may be chucked in succession without changing chucks.

Fig. 1 illustrates a mold constructed with a metal base A having a boss or projection on the surface thereof, the plaster body B of the mold being formed with a recess to removably receive the boss or projection and retain the body on the base.

Fig. 2 shows the base A formed with a recess or opening to removably receive the body portion B of the mold.

Fig. 3 shows the mold B formed with a threaded neck portion, by means of which it may be removably applied in a correspondingly threaded opening or recess formed in the metal base A.

In Fig. 4 the base is formed with a threaded boss or projection 5, which may be threaded into the plaster portion B of the mold. The base in this instance may be of any style and formed with any number of ventilating openings 6, and the drying action controlled by the use of plugs or corks $6^a$. This figure also illustrates one manner of shaping the walls $5^a$ and $5^b$ of the base A so as to form a chamber 7 which is open to the atmosphere, and the ventilating openings 6 may lead into this chamber. The walls $5^a$ and $5^b$ also act as a centering means and provide for a more positive engagement of the mold with the chuck, which may be shaped to either engage the outer walls $5^b$ of the base or inner walls $5^a$ or both the inner and outer walls $5^a$ and $5^b$.

If desired, the walls 5ª and 5ᵇ may be inclined in the opposite direction or they may be both inclined in the same direction, as will be obvious, the object being to provide a socket or more positive engagement for the chuck during the jiggering operation.

Fig. 5 shows the walls 5ª inclined in the opposite direction relatively to Fig. 4 and the chamber 7 less pronounced, or the base made lower, a part of the tray for carrying the molds being shown broken away, a shoulder 5ᶜ being provided to both center and carry the molds in the tray. To provide against possible misalinement of the base of the mold with the tray when the mold is raised from and lowered onto the tray, a clearance space is shown between the outer side of the wall 5ᵇ and the wall of the adjacent supporting flange of the tray, and these respective walls may, if desired, be tapered, to facilitate centering of the mold in the tray during the jiggering operation. This construction including the shoulders 5ᶜ may also be standardized to provide for mounting of any size or shape of mold, the object being to provide standard chucking and supporting means regardless of the shape of the mold. Radial ribs 5ᵈ and holes 5ᵉ serve to provide ventilation for the under side of the plaster portion of the mold, which may be held spaced from the base by said ribs.

Fig. 6 illustrates a method of holding the plaster to the base A by means of ribs 8, which may be formed integral or removably attached to said base and the plaster applied thereover.

In Fig. 7 the metal base A is shown as threaded as at 9 so that the mold B may be similarly threaded and removably applied to the base. The mold proper may be reinforced by embedding suitable wire netting or the like in the plaster forming the body of the mold, as shown at 10. Instead of threads, the base and mold may be formed with male and female projections and indentations to act as a fastening means for the plaster portion relatively to the base and to prevent rotation of the plaster portion thereon, or the plaster portion may be cast in the base and broken out when desired to be renewed. In this instance the entire under surface of the plaster portion of the mold is exposed thereby accelerating the extraction of moisture or the drying action, and the plaster may be made of varying thicknesses as desired, to provide for even or selective drying.

Fig. 8 shows the mold proper B removably applied to the base A through the medium of a clamping ring 11 and screws 12. The ring in this instance also serves to prevent cutting of the edge of the mold by the trimmer during the jiggering operation. This ring may also form the edge of the ware as shown at 11′ and thereby serve to prevent premature drying of the charge around the edge thereof, said ring being formed of material having less moisture-absorbing characteristics than plaster. The metal base may be formed with any number of ventilating openings 13, and by making the wall of the mold thinner at the center than around the edge, or vice versa, the drying action may be regulated, particularly in view of the ventilating openings 13.

In Fig. 9 the base may be formed with a series of suitably shaped apertures to retain the plaster portion B on the base. In this instance the plaster may be primarily molded directly on the base and broken away when it is desired to renew the same.

In Fig. 10 the plaster body B is formed with a chamber 7, to assist in the drying action. The base in this instance may also be formed with a chamber as in Figs. 4 and 5. In this instance also the plaster portion may be primarily molded onto the base and broken away when it is desired to renew the same.

In Fig. 11 the base is formed with a single, suitably shaped boss or projection to retain the plaster portion on the base.

Fig. 12 shows a method of constructing a deep mold. In this instance the base A may be threaded to receive a threaded and shouldered portion of the plaster body B, which may be primarily molded independently of the base.

In Fig. 13 the base A extends down around the sides of the mold body B and shows a series of the ventilating openings 6 formed therein, to regulate the drying action. Any number and size of these openings may be formed in the base and plugs 6ª inserted where desired, to provide for even or selective drying of the charge. The walls of the plaster body may be of any desired thickness.

In Fig. 14 the metal base A is constructed particularly to provide for even and selective drying in deep molds. In this instance the metal ring 11ª may be removably secured to the base as by threads 11ᵇ and also provided with ventilating openings 6. Plugs 6ª may be inserted in these openings to regulate the drying action. As in the form shown by Fig. 8, the metal ring may be extended to form the edge of the ware and completely cover the edge of the plaster portion of the mold, to protect the edge of the mold from chipping from handling and cutting by the trimmer during the jiggering operation, and also prevent premature drying around the edge.

To further ensure even or selective drying of the charge, the base A may be provided with a removable cover member A′, which may be applied after the charge has been finally formed. The member A′ may have any number of the openings 6 formed therein and the plugs 6ª may be used as desired. This member A′ may be shaped to snugly fit the ring 11ª or may be applied directly on the base when the ring is not used. This cover member may be adapted to any of the preceding styles of molds or bases, to retard drying, and is particularly advantageous for molds of varying shapes which require different degrees of dehumidification in drying the ware contained therein or thereon when passing in parallel relation or side by side on an endless conveyor through a drying room.

In constructing the mold as disclosed by Figs. 9 and 10, the plaster portion may be cast inverted, the metal base being supported in alinement on top of the mold-casting form and the liquid plaster poured through one or more of the openings in the said metal base by means such as a tube or funnel and the base held suspended or left remaining over the mold until the plaster is dry or becomes set. By this means, also, the metal base eliminates half of the mold casting form which would otherwise be necessary, thus further reducing the cost of construction. The molds as shown by the remaining figures may also be cast in this manner, if desired, or the plaster portion cast separately. It is preferred, when casting the molds as shown by Figs. 3, 4, 5, 7, 12 and 14 to give the threaded portions of the plaster and base a slight taper, as in Figs. 5 and 12, and to suitably lubricate these threaded portions, to facilitate removal of the plaster body from the base.

What is claimed as new is:—

1. A mold of the class specified, comprising a standard base member and a renewable body member, said members being formed with cooperating recesses and projections for removable association of one with another.

2. A mold of the class specified, comprising a metal base formed with an irregular surface to receive and retain a plaster body portion.

3. A mold of the class specified, comprising a metal base formed with indentations and projections to receive and retain a plaster body portion.

4. In a mold of the class specified, a metal base member formed with a recessed upper surface to removably receive a plaster body portion and lower inclined walls to provide a socket for a chuck.

5. In a mold of the class specified, a standard base member formed with an irregular surface to receive and retain a plaster body member, said base member being provided with means for selectively drying a charge of plastic material.

6. In a mold of the class specified, a standard base member formed with an irregular surface to receive and retain a renewable body member, said base member being formed with selectively closeable openings for admitting atmospheric air to said body member.

7. In a mold of the class specified, a permanent base member formed with an irregular surface to receive and retain a renewable body member, said base member being formed with a chamber and ventilating openings to assist in the drying of a charge of plastic material.

8. In a mold of the class specified, a chambered base member formed with an irregular surface to receive and retain a removable body member, said chamber communicating with said body member to assist in the drying of a charge of plastic material.

9. The method of constructing a mold for use in the manufacture of pottery, which consists in forming the mold with a metal base member having an irregular gripping surface and applying a plaster body member thereto by inverting the metal base in a form containing said body member in a plastic state until set.

10. A mold of the class specified, comprising a metal base member and plaster body member formed with cooperating male and female portions for detachable association of said members to form a complete mold.

11. A mold of the class specified, comprising a metal base member and plaster body member formed with interengaging threaded male and female portions for detachable association of said members to form a complete mold.

Signed by me this 17 day of January, 1927.

WILLIAM J. MILLER.